United States Patent
Murayama

(10) Patent No.: US 8,161,196 B2
(45) Date of Patent: Apr. 17, 2012

(54) COMMUNICATION APPARATUS WITH EXCHANGEABLE RECORDING MEDIUM

(75) Inventor: Noriyuki Murayama, Kanagawa (JP)

(73) Assignee: Kyocera Corporation, Kyoto (JP)

( * ) Notice: Subject to any disclaimer, the term of this patent is extended or adjusted under 35 U.S.C. 154(b) by 1244 days.

(21) Appl. No.: 10/970,155

(22) Filed: Oct. 21, 2004

(65) Prior Publication Data

US 2005/0090285 A1    Apr. 28, 2005

(30) Foreign Application Priority Data

Oct. 23, 2003  (JP) ................................. 2003-363919

(51) Int. Cl.
   *G06F 15/16* (2006.01)
(52) U.S. Cl. ......... 709/250; 709/223; 709/224; 709/230
(58) Field of Classification Search .................... 709/250
   See application file for complete search history.

(56) References Cited

U.S. PATENT DOCUMENTS

| | | | |
|---|---|---|---|
| 6,961,587 B1 * | 11/2005 | Vilppula et al. | 455/558 |
| 2003/0135748 A1 * | 7/2003 | Yamada et al. | 713/193 |
| 2004/0119755 A1 * | 6/2004 | Guibourge | 345/827 |
| 2004/0204202 A1 * | 10/2004 | Shimamura et al. | 455/575.1 |
| 2006/0236111 A1 * | 10/2006 | Bodensjo et al. | 713/176 |
| 2007/0016647 A1 * | 1/2007 | Gupta et al. | 709/206 |
| 2007/0271603 A1 * | 11/2007 | Lee et al. | 726/9 |

FOREIGN PATENT DOCUMENTS

| | | |
|---|---|---|
| JP | 08-009017 | 1/1996 |
| JP | 10207796 A | 8/1998 |
| JP | 2000049687 A | 2/2000 |
| JP | 2001-156904 | 6/2001 |
| JP | 2003198718 A | 7/2003 |

OTHER PUBLICATIONS

Chinese language office action and its English translation for corresponding Chinese application No. CN1430140A.

Japanese language office action dated Feb. 15, 2011 and its English language translation for corresponding Japanese application 2003363919.

* cited by examiner

*Primary Examiner* — Jeffrey Pwu
*Assistant Examiner* — Sulaiman Nooristany
(74) *Attorney, Agent, or Firm* — DLA Piper LLP (US)

(57) ABSTRACT

A mobile terminal capable of displaying data of e-mail etc. stored in an internal memory derived from usage by each user so that the difference of the users when acquiring the data becomes clear, wherein data of received mail acquired along with processing for reception of e-mail and identification data read out from a SIM card via a SIM card interface are stored in a flash ROM associated together and wherein when displaying each received mail stored in the flash ROM on the display, the received mail associated with the identification data read out from the currently attached SIM card and the received mail associated with the other identification data are displayed differently on the display unit 105.

6 Claims, 4 Drawing Sheets

| | |
|---|---|
| RECEIVED MAIL DATA 1 | IDENTIFICATION DATA 2 |
| RECEIVED MAIL DATA 2 | IDENTIFICATION DATA 4 |
| RECEIVED MAIL DATA 3 | IDENTIFICATION DATA 1 |
| RECEIVED MAIL DATA 4 | IDENTIFICATION DATA 3 |
| ⋮ | ⋮ |
| RECEIVED MAIL DATA 100 | IDENTIFICATION DATA 4 |

COMMUNICATION APPARATUS WITH
EXCHANGEABLE RECORDING MEDIUM

BACKGROUND OF THE INVENTION

1. Field of the Invention

The present invention relates to a mobile terminal provided with a loading means of identification data for identifying a user in use, for example relates to a mobile phone or other portable communication terminal provided with an interface for a exchangeable recording medium for storing the identification data.

2. Description of the Related Art

Some GSM (global system for mobile communications) mobile phones acquire an ID number, a telephone number etc. of a subscriber from a exchangeable IC card referred to as a "subscriber identity module" (SIM). When utilizing a mobile phone, these data loaded from the SIM card are used for authentication that the user of the mobile phone is the legitimate subscriber registered at the carrier. Further, by inserting a different SIM card, it becomes possible to change the telephone number of the mobile phone, so it becomes possible for one mobile phone to be shared by several users or for one telephone number to be used selectively for several mobile phones;

A SIM may also store, in addition to the information for identifying the user, personal information of the user such as a "phone book" of frequently used telephone numbers and communication charges.

Japanese Unexamined Patent Publication No. 2001-156904 discloses a technique concerning expansion of the phone book of a user stored in a SIM card or other exchangeable recording medium.

When several users share a single mobile phone as explained above, the data derived from the usage of each user for example e-mails and the log of incoming/outgoing calls is stored in a non-volatile memory of the mobile phone. In many cases, by operating a user interface of the mobile phone, it is possible to display the stored data of all of the users as for example a list on the display screen.

However, a conventional mobile phone is not provided with a mechanism for displaying visually intelligibly on such a list by which specific user each data was prepared and stored.

The phone disclosed in Japanese Unexamined Patent Publication No. 2001-156904 provides a memory area corresponding to every recording medium attached inside a memory of the phone, and each memory area stores the data of the phone book used when the corresponding recording medium is attached. However, when displaying the list of this phone book on the display, since the mechanism for intelligibly showing the data on the list to the user is not disclosed in Japanese Unexamined Patent Publication No. 2001-156904, it is difficult for each user to select data concerning itself from the list, so there is the disadvantage that the convenience of the user is impaired.

For example, even if the user tries to select mail relating to the currently inserted SIM from the list of received mail, it cannot be identified from the list of received mail displayed on the display screen, so the troublesome operation of for example opening each received mail to check the addressee becomes necessary.

Further, if mistakenly opening the received mail of another user, if only the title, addressee, and other header data of the received mail is received, a request will be transmitted to the mail server to download the mail text of the other user. In this case, the download request is rejected at the mail server, so the operation of the user is interrupted until a notification of error is sent back from the mail server. The same is true when mail of another user with a non-received attached file is erroneously opened. Therefore, the operation is interrupted whenever such a mistake occurs. This is very inconvenient.

Further, the risk becomes higher that a user will erroneously recognize received mail addressed to another user as mail addressed to itself and forward this to another person party.

SUMMARY OF THE INVENTION

An object of the present invention is to provide a mobile terminal capable of displaying e-mail and other data acquired due to usage of each user so that the difference of users at the time of acquiring the data becomes clear.

To attain the above object, according to a first aspect of the present invention, there is provided a mobile terminal comprising a data load unit for loading a user identification data from a changeable recording medium, a data storage unit, a first control unit for associating an acquisition data acquired for an execution of a predetermined process with the user identification data, and loading the associated acquisition data and user identification data into the data storage unit, a display unit, and a second control unit for displaying each acquisition data stored in the data storage unit on the display unit, and giving a change to a display object of the acquisition data according to whether the acquisition data is associated with same user identification data loaded from attached recording medium or with the other user identification data.

Preferably, the second control unit displays a first display object of the acquisition data associated with the same user identification data loaded from the attached recording medium and a second display object of the acquisition data associated with the other user identification data differently on the display unit.

Preferably, the mobile terminal comprises a third control unit for checking a coincidence between each user identification data of the acquisition data and the user identification data loaded from the attached recording medium in a case where a recording medium is newly attached or a start-up process is executed, and associating the acquisition data with a first flag data when the coincidence is found in the check, or associating the acquisition data with a second flag data when the coincidence is not found in the check, and wherein the second control unit displays the first display object of the acquisition data associated with the first flag data and the second display object of the acquisition data associated with the second flag data differently on the display unit.

Preferably, the change is that a display image of the acquisition data associated with the same user identification data loaded from the data load unit and a display image of the acquisition data associated with the other user identification data accompany different symbol image each other.

Preferably, the change is that a display image of the acquisition data associated with the user identification data loaded from the data load unit and a display image of the acquisition data associated with the other user identification data have different color, luminance, and/or character form.

Preferably, the change is that a display image of the acquisition data associated with the user identification data loaded from the data load unit and a display image of the acquisition data associated with the other user identification data have different background area in color and/or luminance.

Preferably, the acquisition data stored in the data storage unit includes at least one of an electronic mail data acquired in a process of generating, transmitting or receiving the electronic mail data, an incoming log data or a outgoing log data acquired in a telephone calling process, a registration data acquired in a process of registering an electronic mail address or a telephone number, and an image data acquired in a image pickup process.

According to a second aspect of the invention, there is provided a mobile terminal comprising a data load unit for loading a user identification data from a changeable recording medium, a data storage unit, a display unit, and a control unit for associating an acquisition data acquired for an execution of a predetermined process with the user identification data, loading the associated acquisition data and user identification data into the data storage unit, displaying each acquisition data stored in the data storage unit on the display unit, and giving a change to a display object of the acquisition data according to whether the acquisition data is associated with same user identification data loaded from attached recording medium or with the other user identification data.

Preferably, the control unit displays a first display object of the acquisition data associated with the same user identification data loaded from the attached recording medium and a second display object of the acquisition data associated with the other user identification data differently on the display unit.

Preferably, the control unit checks a coincidence between each user identification data of the acquisition data and the user identification data loaded from the attached recording medium in a case where a recording medium is newly attached or a start-up process is executed, associates the acquisition data with a first flag data when the coincidence is found in the check, associates the acquisition data with a second flag data when the coincidence is not found in the check, and displays the first display object of the acquisition data associated with the first flag data and the second display object of the acquisition data associated with the second flag data differently on the display unit.

Preferably, the change is that a display image of the acquisition data associated with the same user identification data loaded from the data load unit and a display image of the acquisition data associated with the other user identification data accompany different symbol image each other.

Preferably, the change is that a display image of the acquisition data associated with the user identification data loaded from the data load unit and a display image of the acquisition data associated with the other user identification data have different color, luminance, and/or character form.

Preferably, the change is that a display image of the acquisition data associated with the user identification data loaded from the data load unit and a display image of the acquisition data associated with the other user identification data have different background area in color and/or luminance.

Preferably, the acquisition data stored in the data storage unit includes at least one of an electronic mail data acquired in a process of generating, transmitting or receiving the electronic mail data, an incoming log data or a outgoing log data acquired in a telephone calling process, a registration data acquired in a process of registering an electronic mail address or a telephone number, and an image data acquired in a image pickup process.

According to a third aspect of the invention, there is provided a method for displaying data on a mobile terminal comprising a first step for attaching a changeable recording medium to the mobile terminal having a data storage unit and a display unit, and loading a user identification data from the recording medium to the mobile terminal, a second step for associating an acquisition data acquired for an execution of a predetermined process in the mobile terminal with the user identification data loaded to the mobile terminal in the first step, and loading the associated acquisition data and user identification data into the data storage unit, and a third step for displaying each acquisition data stored in the data storage unit on the display unit, and giving a change to a display object of the acquisition data according to whether the acquisition data is associated with same user identification data loaded from attached recording medium or with the other user identification data.

According to the present invention, the e-mail and other data acquired due to usage by each user can be displayed so that the difference of the users at the time of the acquisition of the data becomes clear.

BRIEF DESCRIPTION OF THE DRAWINGS

These and other objects and features of the present invention will become clearer from the following description of the preferred embodiments given with reference to the accompanying drawings, in which.

DESCRIPTION OF THE PREFERRED EMBODIMENTS

Below, an embodiment of the present invention applied to a mobile phone will be explained with reference to the drawings.

Figure 1:
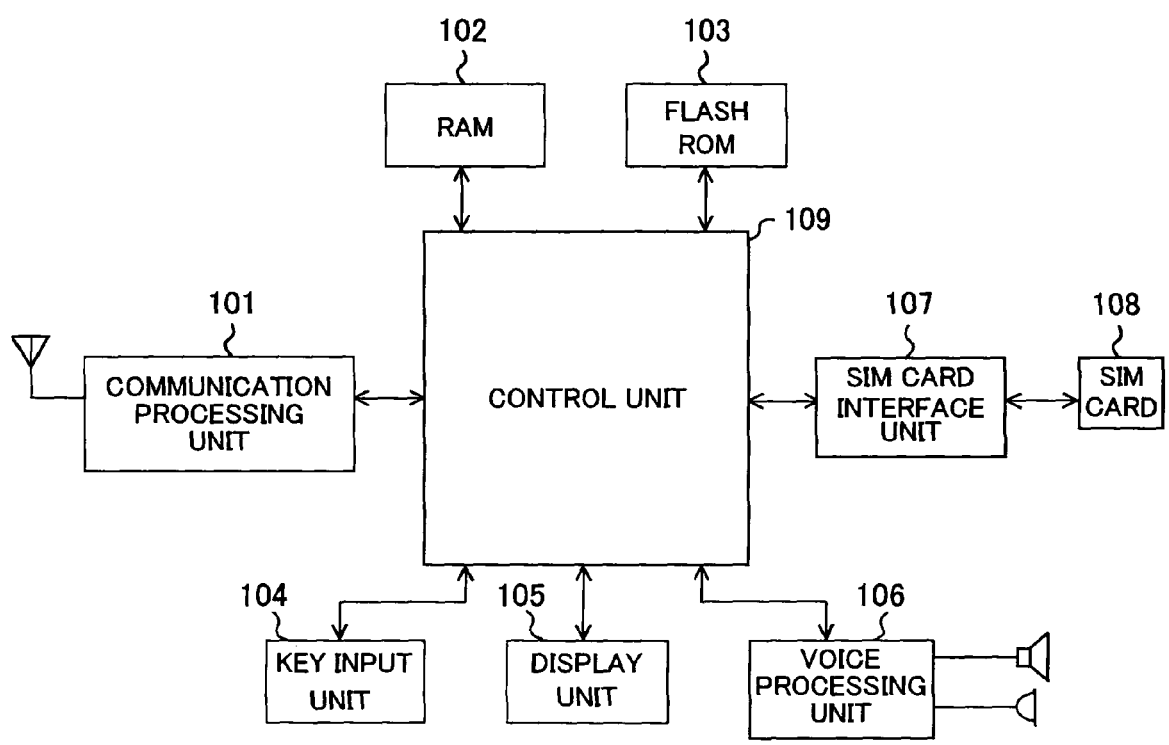
FIG. 1 is a block diagram of an example of the configuration of a mobile phone according to the present embodiment.

FIG. 1 is a block diagram of an example of the configuration of a mobile phone 10 according to the present embodiment.

The mobile phone 10, for example as shown in FIG. 1, has a communication processing unit 101, a RAM 102, a flash ROM 103, a key input unit 104, a display unit 105, a voice processing unit 106, a SIM card interface unit 107, a SIM card 108, and a control unit 109.

The SIM card interface unit 107 is an embodiment of the data load unit of the present invention.

The flash ROM 103 is an embodiment of the storage unit of the present invention.

The display unit 105 is an embodiment of the display unit of the present invention.

The control unit 109 is an embodiment of the first control unit, the second control unit, and the third control unit of the present invention.

Note that, as will be explained later, the SIM card 108 is a card type recording medium which can be inserted into and removed from a dedicated slot of the mobile phone 10.

The communication processing unit 101 performs processing for wireless communication with a not illustrated base station. For example, it applies predetermined modulation processing to various data such as voice data or e-mails processed at the control unit 109 to generate a wireless signal and transmit this from an antenna.

Further, the communication processing unit 101 applies predetermined demodulation processing to the signal transmitted wirelessly from the base station and received at the antenna to reproduce various data such as voice data and e-mails and outputs this to the control unit 109.

The RAM 102 includes for example a static random access memory (SRAM) or other volatile memory and stores temporary data utilized in the processing of the control unit 109. For example, it stores a program of the control unit 109 and identification data of a user stored in the SIM card 108 explained later.

When the power is turned on in a state where the SIM card 108 is attached to the mobile phone 10, the control unit 109 reads out the control program stored in the flash ROM 103 and the identification data of the user stored in the SIM card 108 and loads them into the RAM 102.

The flash ROM 103 stores various data which must be held even after turning off the power such as programs for executing various processings (telephone calling, e-mailing, browsing of the Internet, etc.) in the control unit 109, the incoming and outgoing mail acquired by these processings, the incoming/outgoing call log, the address book, etc.

The key input unit 104 has keys corresponding to various input data such as an end (speech end)/power key, a start (call) key, number keys, and symbol keys. When these keys are depressed or otherwise operated for input, the key input unit 104 generates a signal in accordance with the related operation and outputs this to the control unit 109.

The display unit 105 displays various data under the control of the control unit 109. For example, it has an LCD panel, an organic EL panel, or other display device and displays various data in accordance with display data supplied from the control unit 109 such as the standby state image, telephone number, e-mail or other text data, etc.

The voice processing unit 106 has a voice processing circuit and is connected to a microphone for voice input and a speaker for voice output for the use of telephone calling function.

The voice processing unit 106 applies amplification, analog-to-digital conversion, encoding, and other signal processing to the electric voice signal converted from the sound at the microphone to generate the voice data and outputs this to the control unit 109.

Further, the voice processing unit 106 applies decoding, digital-to-analog conversion, amplification, and other signal processing to the voice data supplied from the control unit 109 to generate a voice signal and outputs it as sound from the speaker.

The SIM card interface unit 107 performs the interfacing for transferring data between the SIM card 108 and the control unit 109. The control unit 109 accesses the data of the SIM card 108 via this SIM card interface unit 107.

The SIM card 108 is a card type recording medium which can be attached to a dedicated slot of the mobile phone 10 and includes an electrically erasable programmable read-only memory (EEPROM) or other non-volatile memory.

The SIM card 108 stores 15-digit identification data referred to as an "international mobile subscriber identity" (IMSI) individually allocated to cards (hereinafter simply described as "identification data") as the data from the carrier for identifying the user of the SIM. Further, it stores data such as a phone book and communication charges rewritable in accordance with usage by the user.

The control unit 109 has a computer for executing processing based on programs stored in the flash ROM 103 and performs various processing concerning the overall operation of the mobile phone 10.

For example, the control unit 109 controls incoming/outgoing calls of the communication processing unit 101 based on the predetermined communication protocol as processing concerning voice communication and e-mailing. Further, it performs processing for inputting and outputting voice data with the voice processing unit 106 when performing the voice communication, processing for displaying various types of data in the display unit 105, and processing for input of data from the key input unit 104 etc. as processing concerning the user interface. Further, in the process of such processing, the control unit 109 appropriately accesses the RAM 102, the flash ROM 103, and the SIM card 108 and performs the reading and writing of the data.

Further, the control unit 109 accesses the SIM card 108 via the SIM card interface unit 107 when the SIM card 108 is newly attached to the slot of the mobile phone 10 or when the power is turned on, reads out the identification data stored in the card, and loads the data into the RAM 102. Then, the control unit 109 transmits this identification data to the authentication server managed by the carrier and requests the establishment of communication.

The authentication server authenticates the user based on the identification data. When the establishment of communication is allowed, the position of the mobile phone 10 having the identification data in the mobile phone network is registered in the position management server. By this, it becomes possible for the mobile phone 10 to perform telephone calling, e-mailing, and other communication via the mobile phone network.

Further, the control unit 109 associates the received mail and other acquisition data acquired along with the execution of the above processing with the above identification data loaded from the SIM card 108 via the SIM card interface unit 107, and loads the associated acquisition data and the identification data into the flash ROM 103.

Figures 2, 3:
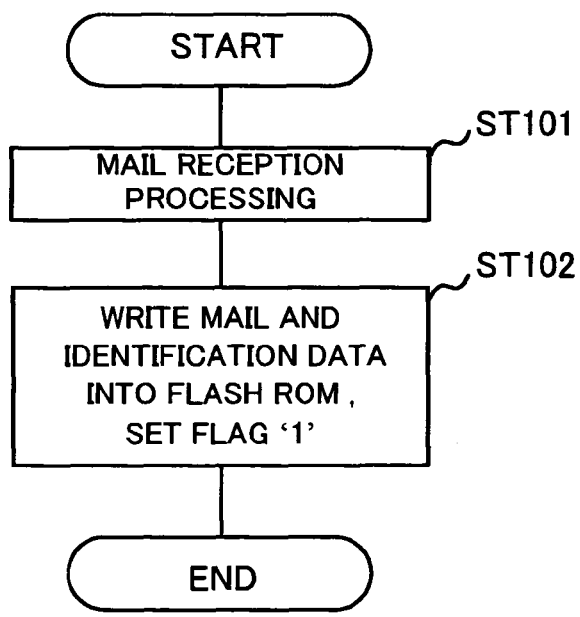
FIG. 2 is a table illustrating an example of received mail data and identification data stored in a flash ROM.
FIG. 3 is a flow chart illustrating an example of the flow of processing for writing data of received mail into the flash ROM.

FIG. 2 is a table illustrating an example of the received mail data and identification data stored in the flash ROM 103. As shown in FIG. 2, the identification data is associated with the received mail data stored in the flash ROM 103. For example, when data of 100 received e-mails are stored as shown in FIG. 2, 100 sets of identification data individually associated with received mail data are stored in the flash ROM 103.

When for example a predetermined data display mode is selected by a user operation of the key input unit 104, the control unit 109 executes a process for displaying each set of acquisition data stored in the flash ROM 103. For example, the control unit 109 executes a process for displaying a list of the received mail on the display unit 105.

In this case, the control unit 109 gives a change to a display object of the acquisition data according to whether the acquisition data is associated with the identification data loaded from the SIM card 108 or with the other identification data. In other word, the control unit 109 makes the display objects of the acquisition data on the display unit 105 different in accordance with the difference of the identification data associated with the acquisition data.

For example, the control unit 109 differentiates the display object of the acquisition data associated with the identification data loaded from the SIM card 108 from the display object of the acquisition data associated with the other identification.

By this, the acquisition data associated with the identification data stored in the SIM card 108 currently attached can be easily discriminated from among the plurality of acquisition data displayed on the display unit 105.

Next, an explanation will be given of the operation of the mobile phone 10 having the above configuration focusing on the parts relating to the memory and display of the acquisition data of the present invention. Note that, in the following example, the acquisition data is made the received mail.

FIG. 3 is a flow chart illustrating an example of the flow of the processing for writing data of the received mail into the flash ROM 103.

Step ST101

When the processing mode for receiving e-mails is selected from among the various processing modes of the mobile phone 10, the control unit 109 requests the download of the e-mails to a not illustrated mail server and receives the e-mails transmitted from the mail server in response to this request.

Step ST102

When receiving a new e-mail, the control unit 109 writes the identification data stored in the currently attached SIM card 108 and the data of the received mail into the flash ROM 103 associated together. Further, the control unit 109 associates the flag data of the value '1' with the received mail. The setting of the association of the flag data with the received mail will be explained later.

Note that, by the startup processing explained next, the identification data stored in the currently attached SIM card 108 is loaded into the RAM 102 in advance, so the control unit 109 can read out the identification data from the RAM 102 in place of the SIM card 108 and write the same into the flash memory ROM 103 as well.

Figure 4:
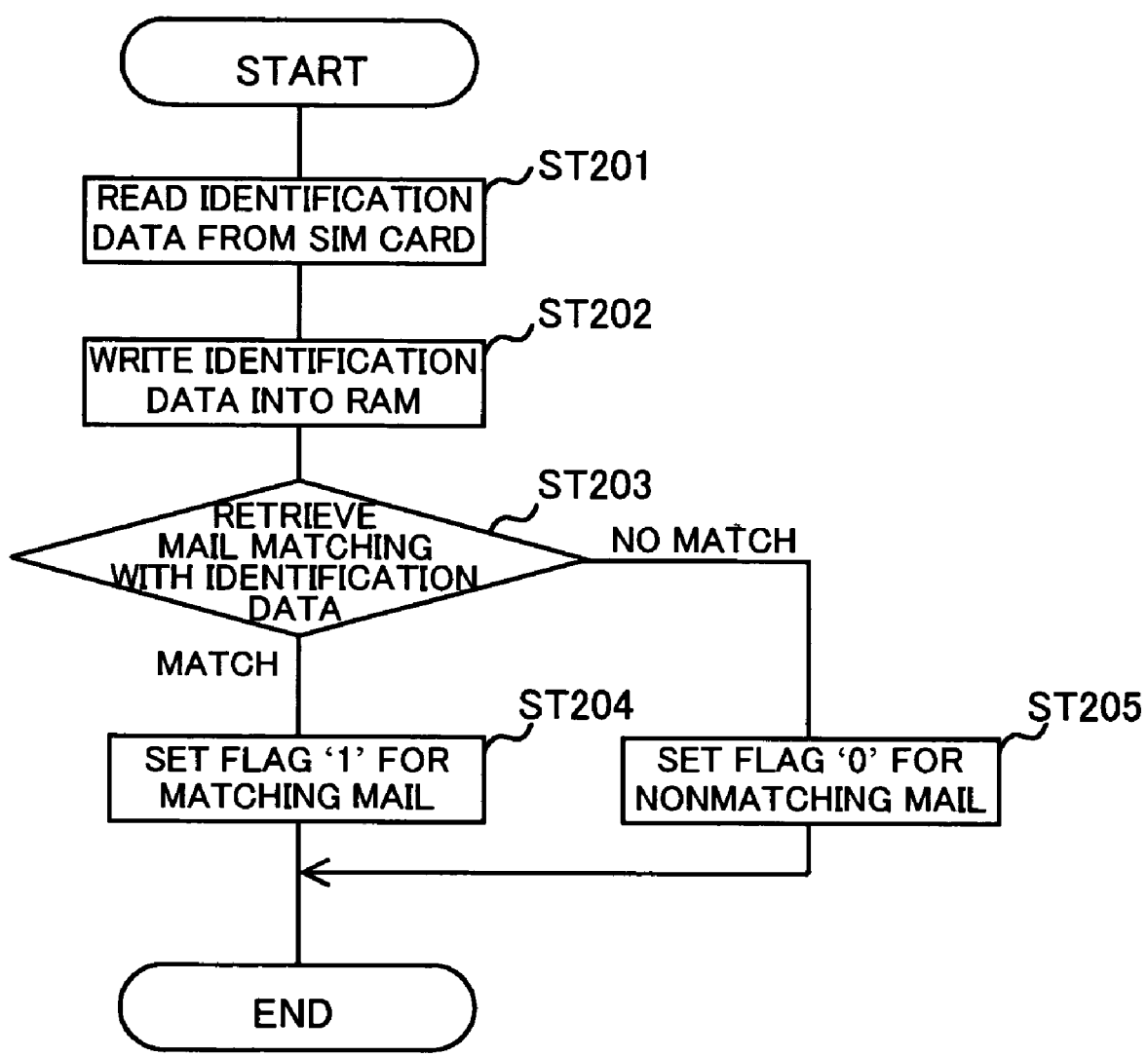
FIG. 4 is a flow chart illustrating an example of the flow of startup processing.

FIG. 4 is a flow chart illustrating an example of the flow of the startup processing.

Step ST201

For example, when the startup processing is executed for example when the power is turned from off to on, when a SIM card 108 is newly loaded in the slot of the mobile phone 10, when a predetermined reset button is depressed, etc., the control unit 109 accesses the SIM card 108 via the SIM card interface unit 107 and reads out the identification data stored in it.

Step ST202

Then, the control unit 109 writes the identification data read out from the SIM card 108 into the predetermined memory area of the RAM 102.

Due to this, when a need for reading the identification data stored in the currently loaded SIM card 108 arises, the control unit 109 can read this out from the high access speed RAM 102 in place of reading it from the SIM card 108, so the processing can be made faster.

Steps ST203, ST204, and ST205

When writing the identification data into the RAM 102, next the control unit 109 compares the identification data associated with each received mail stored in the flash ROM 103 and the identification data stored in the RAM 102 and checks whether or not the two coincide. Then, the control unit 109 associates the flag data of the value '1' with the received mail when this check finds the identification data matches and associates the flag data of the value '0' with the received mail when this check finds the identification data does not match.

For example, the control unit 109 loads, as the data corresponding to the received mail stored in the flash ROM 103, the data of the storage address of each received mail in the flash ROM 103, the data of the main text of each received mail, etc. into a predetermined memory area in the RAM 102 and also loads the above flag data into that memory area associated with the data corresponding to this received mail.

Due to this, the control unit 109 can quickly judge whether or not each received mail is associated with the identification data of the currently attached SIM card 108 by simple processing for checking the value of the flag data stored in the RAM 102.

Figure 5:
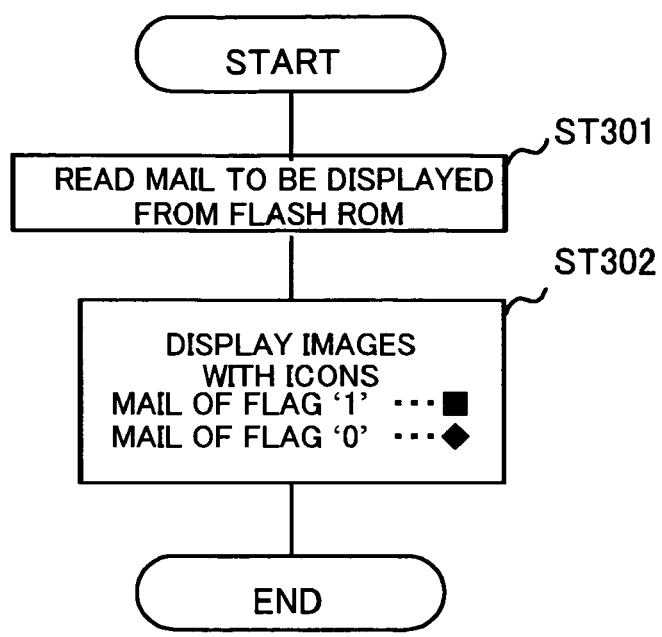
FIG. 5 is a flow chart illustrating an example of the flow of the processing for displaying a list of received mail at a display.

FIG. 5 is a flow chart illustrating an example of the flow of the processing for displaying a list of the received mail on the display unit 105.

Step ST301

When the processing mode for displaying the list of the received mail is selected from among the various processing modes of the mobile phone 10, the control unit 109 reads out the data of the received mail stored in the flash ROM 103 and loads the data into the RAM 102.

Step ST302

The control unit 109 displays a list of the received mail on the display unit 105 based on the data of received mail stored in the RAM 102.

Further, the control unit 109 checks the above flag data stored in the predetermined memory area of the RAM 102 and configures the display on the display unit 105 so that a black square icon is added to the received mail associated with the flag data of '1' and a black diamond icon is added to the received mail associated with the flag data of '0'.

Figure 6:
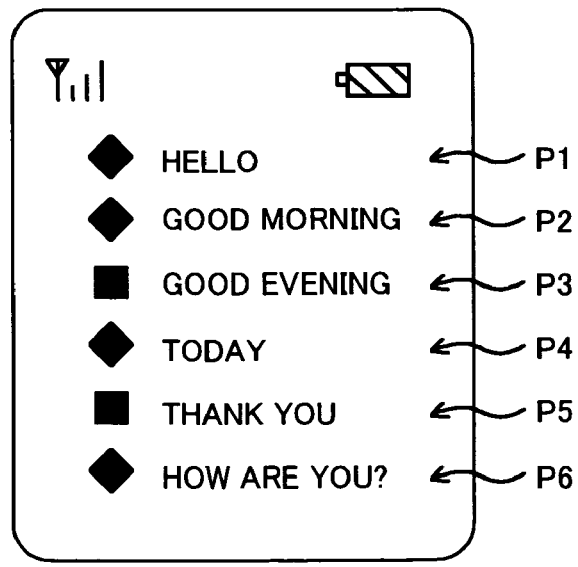
FIG. 6 is a view illustrating an example of the received data displayed as a list at the display.

FIG. 6 is a view illustrating an example of the received data displayed as a list on the display unit 105.

In the example of FIG. 6, titles of received mail indicated by the notations P1 to P6 are displayed successively arranged in the vertical direction on the screen. Black square or diamond icons are added to the left sides of the titles.

As explained above, according to the mobile phone 10 according to the present embodiment, the data of the received mail acquired along with the processing for receiving the e-mail and the identification data read out from the SIM card 108 via the SIM card interface unit 107 are stored in the flash ROM 103 associated together. When displaying the received mail stored in the flash ROM 103 on the display unit 105, the received mail associated with the identification data read out from the currently attached SIM card 108 and the received mail associated with the other identification data are displayed differently at the display unit 105.

Accordingly, it becomes possible to easily discriminate the mail received using the currently attached SIM card 108 from among the plurality of received mail displayed on the display unit 105. Due to this, the user can select the intended received mail without the troublesome operation of for example opening the received mail and checking the addressee, so the convenience to the user can be improved.

Further, it becomes possible to clearly determine the received mail corresponding to the currently attached SIM card 108, therefore the frequency of erroneously opening the received mail of another user can be reduced. Due to this, the inconvenience of the operation being interrupted for a long time when only header data was received or mail of another user with an attached file not yet received is erroneously opened can be reduced.

Further, the risk of erroneously recognizing received mail directed to another user as mail directed to oneself and forwarding this to another person can be reduced.

Further, the data of the received mail acquired at the time of attaching a different SIM card is managed centrally in the flash ROM 103 by a simple structure as shown in FIG. 2, therefore the processing concerning management of the memory can be simplified in comparison with the method of assigning a different memory area for each SIM card.

Further, the received mail of other users can be displayed by a list without concealment, therefore, when for example several persons use a mobile phone owned by a company, management of the mobile phone can be made easy. For example, even when the memory area of the received mail becomes insufficient, the received mail of other users can be displayed on a list, so deletion of mail or other maintenance can be easily carried out. Further, according to the present embodiment, there is the convenience that the received mail acquired by the currently operating user can be easily distinguished from among the received mail displayed in a list while keeping such an advantage.

Further, according to the mobile phone 10 of the present embodiment, when a SIM card 108 is newly attached or when a predetermined startup processing is executed, it is checked whether or not the identification data of each received mail stored in the flash ROM 103 coincides with the identification data read out from the SIM card 108 via the SIM card interface unit 107. The received mail is associated with the flag data of '1' when the coincidence is found in this check, while the received mail is associated with the flag data of '0' when the coincidence is not found in this check. Then, when each received mail stored in the flash ROM 103 is displayed on the display unit 105, the received mail associated with the flag data of '1' and the received mail associated with the flag data of '0' are displayed differently on the display unit 105.

Accordingly, by the simple processing of checking the value of the flag data associated with each received mail, it can be quickly performed to judge whether or not each received mail is associated with the identification data of the currently loaded SIM card 108, and to configure the display object on the display unit 105 after the judgment. Therefore, the time required for displaying the list of the received mail can be shortened.

Note that, the present invention is not limited to the above embodiment. Various modifications are possible.

In the above embodiment, the received mail associated with the identification data read out from the currently loaded SIM card 108 and the received mail associated with other identification data are displayed with different shaped icon image, but the present invention is not limited to this.

For example, in order to indicate the difference between the types of received mail, it is also possible to make the color and luminance of the icons at the time of displaying the list different, make the color and luminance of the title of each received mail and the name of the sender different, or make the format of the characters (character thickness, font, etc.) of the titles of the received mail and the names of the senders different.

Alternatively, it is also possible to use a different predetermined color for the background of the display region of the image representing a title of the received mail and the name of the sender (background in the vicinity of the character) or make the luminance of the background of the display region different. In this case, naturally a range where adjoining received mails do not interfere on a list is preferably defined as the display region.

Further, in order to indicate the difference between the types of received mail, it is also possible to surround the display region of each received mail by a predetermined graphic.

In the above embodiment, as an example of the acquisition data stored in the flash ROM 103, the data of the received mail acquired by processing for reception of e-mail was explained, but the present invention is not limited to this. The present invention can also be applied to acquisition data acquired along with the execution of various processing and stored in the flash ROM or other storing means.

For example, it is possible to apply the present invention in the same way as the case of received mail to data of e-mail in the middle of processing, data of e-mail transmitted by the e-mail transmitting process, data of the incoming/outgoing log acquired along with telephone calling process, and various types of data acquired along with the processing for registration of e-mail addresses or telephone numbers in the address book etc.

Further, it is also possible to apply the present invention to the data of a photo image acquired along with imaging in a mobile phone equipped with a camera function.

In any case, the acquisition data is associated with identification data of the SIM card at the time of the acquisition. Further, the acquisition data associated with the identification data read out from the currently attached SIM card and the acquisition data associated with other identification data are displayed in different manners when displaying the list. For this reason, the effect is achieved that the difference between the two can be easily distinguished on the list.

In the above embodiment, the acquisition data associated with the identification data stored in the currently attached recording medium and the acquisition data associated with other identification data were displayed differently on the display, but the present invention is not limited to this. A difference can be imparted to for example the display of the acquisition data for each identification data as well.

By this, it becomes possible to easily distinguish which users acquired the displayed acquisition data.

In the above embodiment, further, an example in which the IMSI was used as the data for identifying the user was shown, but the present invention is not limited to this. When displaying for example a list of the received mail, the mail address and mail account can be used as the identification data as well. Namely, it need only be data enabling identification of the user involved in the acquisition of the data which is intended to be displayed differently on the display.

In the above embodiment, the example of using a SIM card as the recording medium for storing the identification data was shown, but the present invention is not limited to this. It is also possible to use other various recording media for example a user identity module (UIM) card.

In the above embodiment, the example of using a flash ROM for the storing means for storing the acquisition data and the identification data associated together was shown, but the present invention is not limited to this. It is also possible to use various other storing means capable of holding the memory data even in a state when the power is turned off such as an EEPROM or non-volatile RAM.

In the above embodiment, the example of loading the identification data read out from the recording medium on to a RAM was shown, but it is also possible to read out the identification data from the recording medium whenever it is utilized for processing without loading the identification data on the RAM so long as the access speed of the recording medium is fast enough to prevent obstacles in the processing.

In the above embodiment, the example where the processing of the control unit 109 was performed based on a program was shown, but it is also possible to execute at least part of the processing by hardware.

Further, conversely, it is also possible if at least part of the processing in another unit other than the control unit 109 is executed in the computer of the control unit 109.

In the above embodiment, further, the example of applying the present invention to a mobile phone was shown, but the present invention is not limited to this. The present invention can also be applied to various mobile terminals such as a personal digital assistant (PDA).

While the invention has been described with reference to specific embodiments chosen for purpose of illustration, it should be apparent that numerous modifications could be made thereto by those skilled in the art without departing from the basic concept and scope of the invention.

What is claimed is:

1. A mobile terminal comprising:
   a data load unit that reads first user identification data from an attached recording medium;
   a data storing unit that stores electronic mail and phone call records, and second user identification data associated with the electronic mail and phone call records;
   a control unit that checks whether the first user identification data matches the second user identification data, and that allows a user access to all the electronic mail and phone call records stored in the data storing unit even if the second user identification data does not match the first user identification data; and
   a display unit that displays electronic mail and phone call records having second user identification data that matches the first user identification data differently than electronic mail and phone call records having second user identification data that does not match the first user identification data, wherein
   the control unit associates a flag with each electronic mail and phone call record, the flag having a first value when the first user identification data matches the second user identification data and a second value when the first user identification data does not match the second user identification data,
   the display unit displays a list of electronic mail and phone call records,
   the display unit displays each electronic mail and phone call record in the list having an associated flag of the first value with a first icon or in a first color, and
   the display unit displays each electronic mail and phone call record in the list having an associated flag of the second value with a second icon that is different from the first icon or in a second color that is different from the first color.

2. The mobile terminal of claim 1, wherein the control unit checks whether the first user identification data matches the second user identification data when a starting processing is executed, the attached recording medium is newly loaded or a reset process is executed.

3. The mobile terminal of claim 1, wherein
   the first value of the flag is '1', and
   the second value of the flag is '0'.

4. A method for displaying data on a mobile terminal comprising:
   reading first user identification data from an attached recording medium;
   storing electronic mail and phone call records, and second user identification data associated with the electronic mail and phone call records;
   checking whether the first user identification data matches the second user identification data and allowing a user access to all the stored electronic mail and phone call records even if the second user identification data does not match the first user identification data; and
   displaying electronic mail and phone call records having second user identification data that matches the first user identification data differently than electronic mail and phone call records having second user identification data that does not match the first user identification data, wherein
   a flag is associated with each electronic mail and phone call record, the flag having a first value when the first user identification data matches the second user identification data and a second value when the first user identification data does not match the second user identification data,
   a list of electronic mail and phone call records is displayed,
   each electronic mail and phone call record in the list having an associated flag of the first value is displayed with a first icon or in a first color, and
   each electronic mail and phone call record in the list having an associated flag of the second value is displayed with a second icon that is different from the first icon or in a second color that is different from the first color.

5. The method of claim 4, wherein checking whether the first user identification data matches the second user identification data occurs when a starting processing is executed, the attached recording medium is newly loaded or a reset process is executed.

6. The method of 4, wherein
   the first value of the flag is '1', and
   the second value of the flag has a value of is '0'.

* * * * *